March 14, 1933. W. HERMAN ET AL 1,901,514
METHOD OF PRODUCING WIRE RODS
Filed Sept. 11, 1930 4 Sheets-Sheet 1
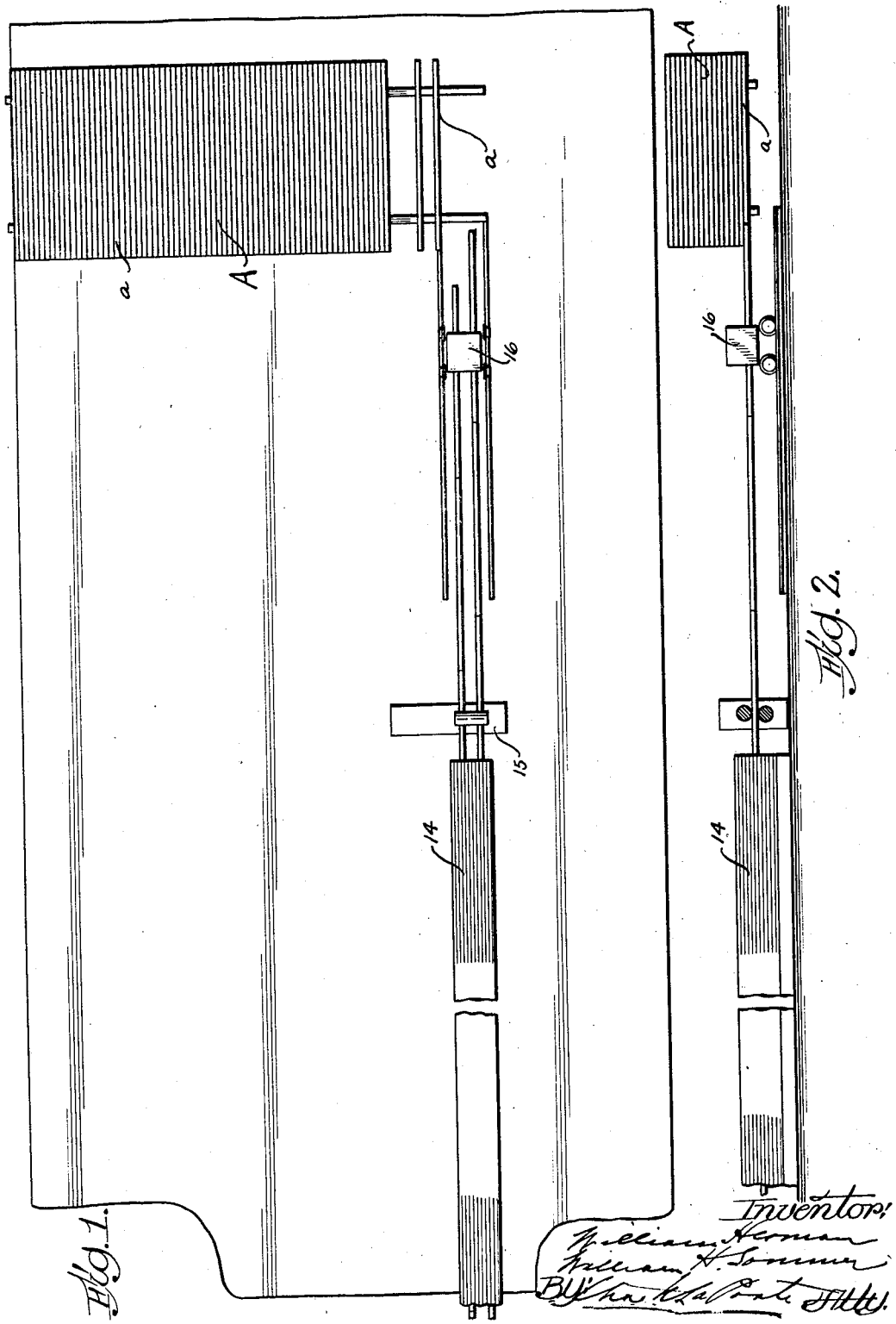

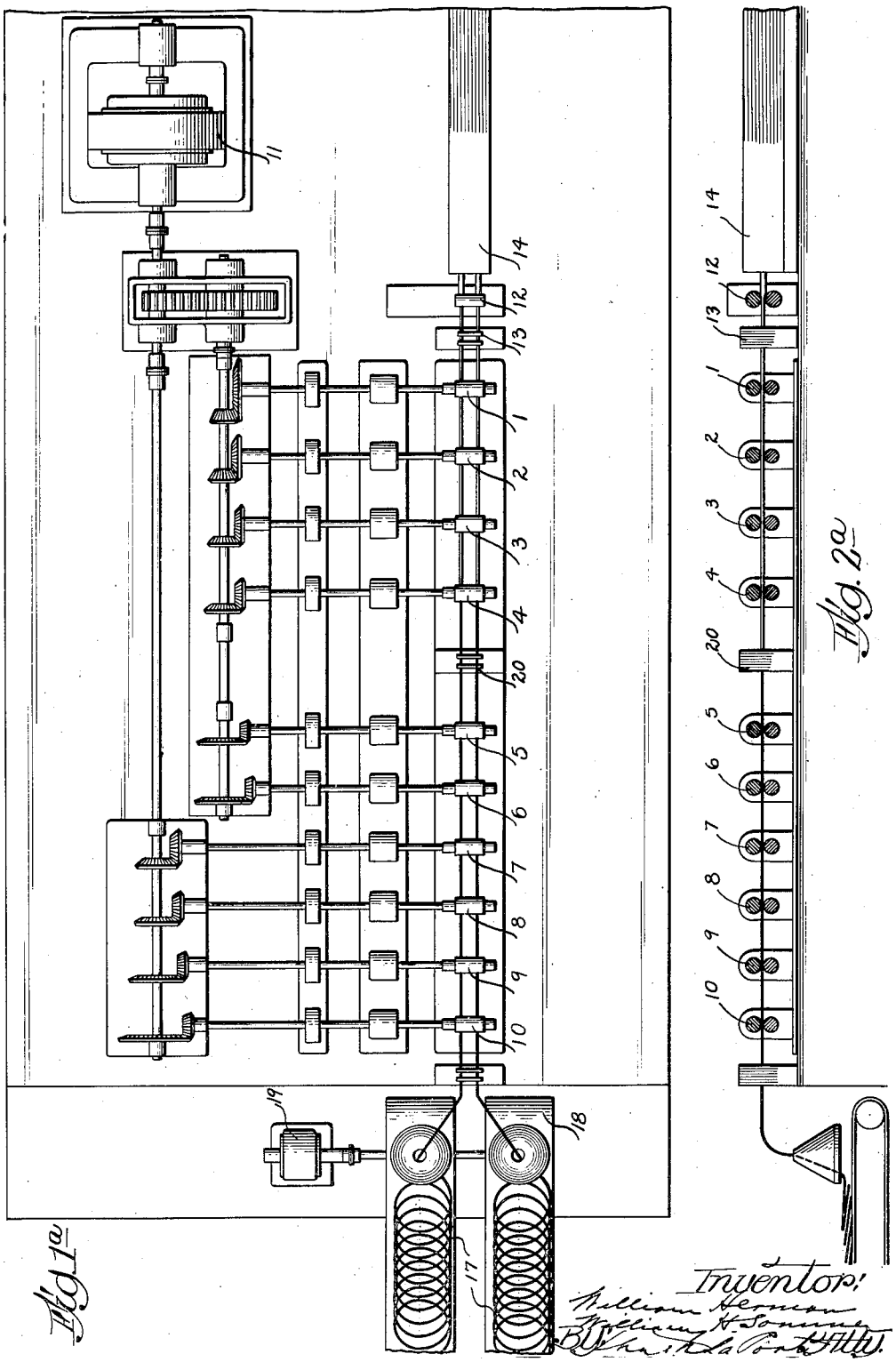

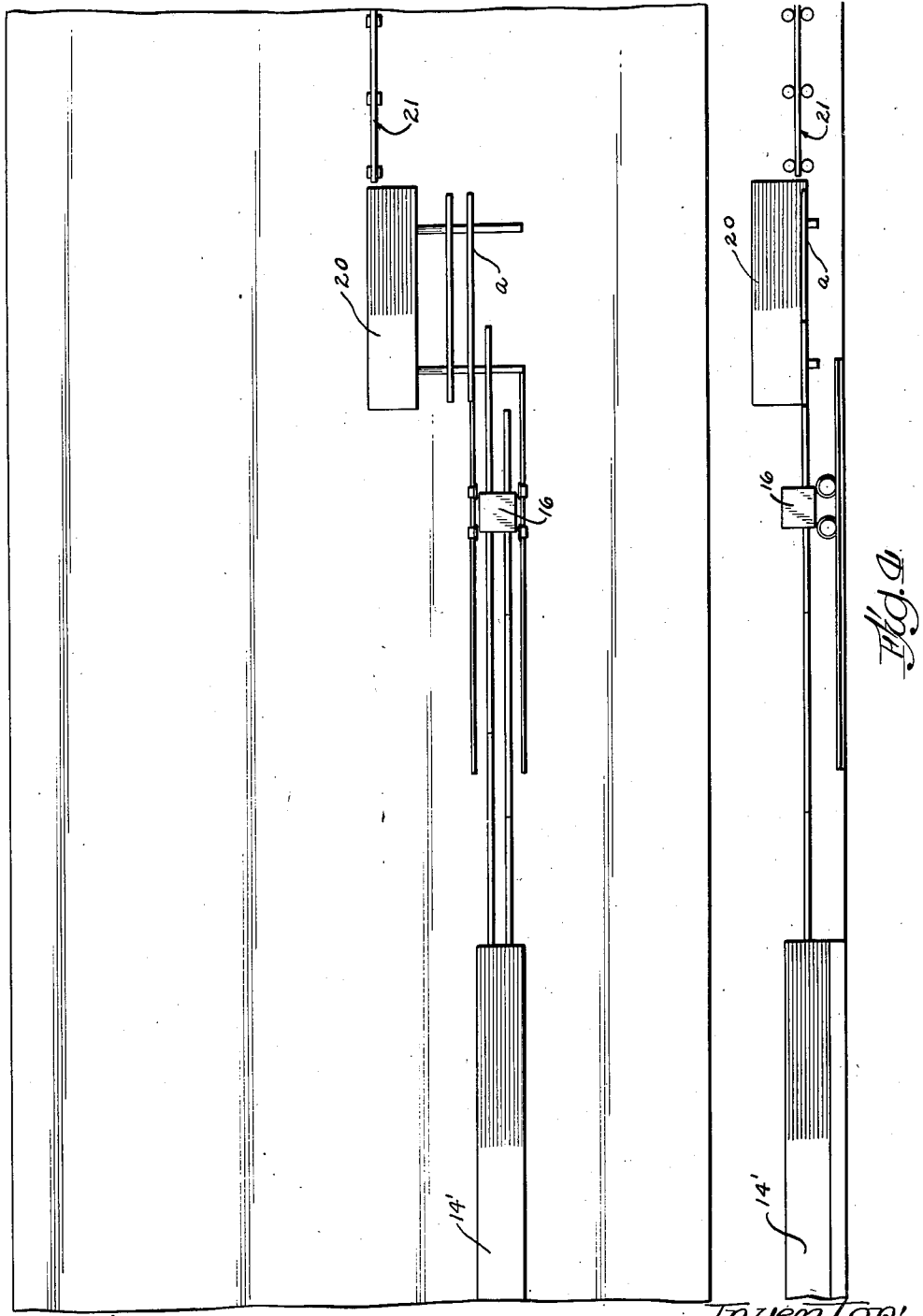

March 14, 1933. W. HERMAN ET AL 1,901,514
METHOD OF PRODUCING WIRE RODS
Filed Sept. 11, 1930 4 Sheets-Sheet 4
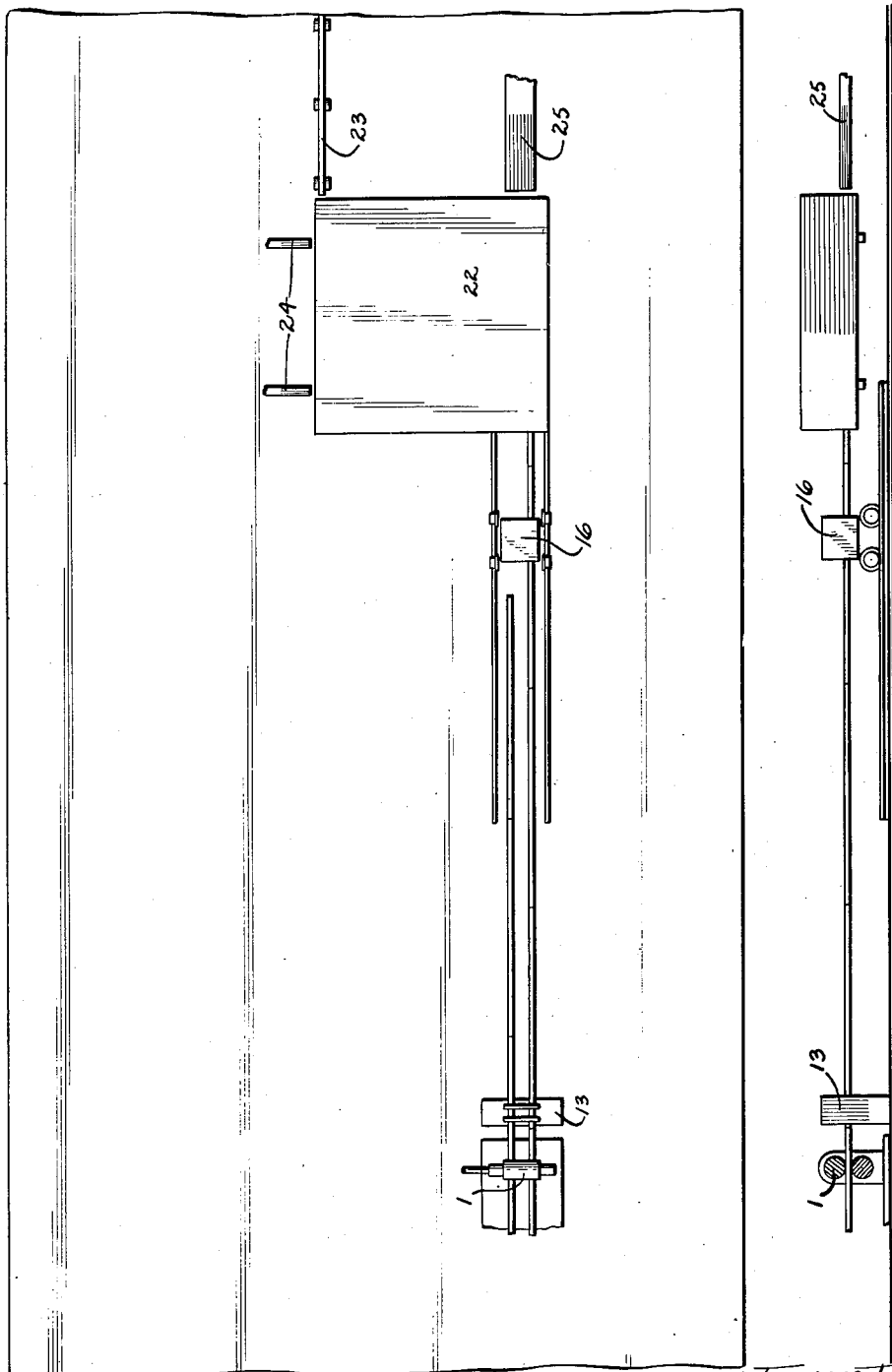

Patented Mar. 14, 1933

1,901,514

UNITED STATES PATENT OFFICE

WILLIAM HERMAN AND WILLIAM H. SOMMER, OF PEORIA, ILLINOIS

METHOD OF PRODUCING WIRE RODS

Application filed September 11, 1930. Serial No. 481,144.

This invention has reference to a new and improved method of producing wire rods.

The invention has for its principal object to produce endless wire rods from a continuous bar formed by butt welding individual billets and alternately rolling and stretching the bar so formed, to rod size.

The invention has for a further object to heat the material from which the rod is rolled, prior to the reducing step. This may be accomplished in several ways—viz. by heating the material to rolling temperature following the welding step; pre-heating the material prior to welding and then heating to rolling temperature subsequently to the welding step, or heating the material to rolling temperature before the welding step. In whatever form the method is employed, the butt welding of individual billets to form a continuous bar is essential to the production of endless rods.

A further object of the invention is to produce endless rods from a continuous bar formed by butt welding individual billets, which consists in employing a welding means adapted to progressively and successively butt weld the ends of billets as they are brought into juxtaposed relation and while the billets are moving, and reducing the bar so formed, by a series of successive operations, preferably by alternately rolling and stretching the bar and heating the bar prior to the reducing step.

A still further object of the invention is to coil the endless rods into a series of convolutions and to remove the coiled rods from the point of coiling.

Other and further objects will more fully appear from the following description.

That the invention may be more fully understood, reference is had to the accompanying drawings, forming part of the description, illustrating preferred forms of the invention, in which:—

Figs. 1 and 1ª, considered together, show in a diagrammatic way a preferred form of rod mill unit;

Figs. 2 and 2ª, considered together, show in elevation and partly in section the mill of Figs. 1 and 1ª;

Fig. 3 is a diagrammatic plan of a modified form of mill illustrated by Figs. 1 and 1ª, the modification consisting in providing for pre-heating the material prior to the welding step and subsequently heating the material to rolling temperature;

Fig. 4 is an elevation of Fig. 3;

Fig. 5 is a diagrammatic plan of a further modification, wherein provision is made for heating the material to rolling temperature prior to the welding step; and Fig. 6 is an elevation of Fig. 5.

Like characters of reference denote corresponding parts thruout the figures.

In the art of rolling rods, it is the accepted practice to produce the rods from billets which have been rolled and preferably cut to approximately thirty (30) foot lengths. The billets are then heated and while in the heated state are individually and successively pushed into position to be individually and successively acted on by the successive stands of rolls whereby to roll each billet into a rod which is coiled into a bundle. The accustomed practice is to provide sixteen (16) or eighteen (18) stands and to reduce the billet to rods by a substantial rolling action and with little or no stretching action. Stretching in the usual practice causes overfilled ends on the billets, and such overfilled ends results in loss of material and decrease in production. Also, with the present practice cropping of the front end of each billet is necessary because of overfilled ends and the billets unless cropped would fail to enter the successive passes in the rolling operation. Cropping, furthermore, results in considerable loss of metal. Cobbling is another of the serious difficulties encountered in the present and accepted practice of rod rolling. This term is used to designate the scrap material caused by the billet failing to enter a guide or pass and shooting out between the stand, thereby materially reducing the yield of the mill.

By employing the method of the present invention cropping and cobbling is substantially if not wholly eliminated and except for the initial feeding of the continuous bar, formed by the butt welding of individual billets, there will be no loss occasioned by overfill. This results from the elimination, during rolling, of the use of a series of billets, because the formation of a continuous bar by butt welding the individual billets absolutely does away with ends to be cropped, will prevent cobbling and there can be no overfilled ends except on the front end of the continuous bar delivered to the roll stands. Furthermore, by the method of the present invention the number of roll stands can be materially decreased and instead of eliminating stretching of the bar between the stands, which at present is objectionable, stretching of the bar between stands becomes an element in the reducing operation and may be and is employed without difficulty. This is accomplished in the relative speed of the rolls of successive stands, whereby the bar is reduced to rod size by an alternate rolling and stretching action.

In the drawings, having particular reference to Figs. 1, 1ª, 2 and 2ª wherein, in a more or less diagrammatic way we show a preferred form of rod mill 1, 2, 3, 4, 5, 6, 7, 8, 9 and 10 designate roll stands, which are not unlike stands employed in the present practice. These stands have a spaced relation in respect of each other as will obtain the best results and the successive sets of rolls have a speed relation in respect of the preceding set as will produce a stretching action on the bar between sets of rolls whereby, there is an alternate rolling and stretching action on the bar and whereby, it is possible to employ a fewer number of stands than is required in the ordinary and usual rod mill practice. The successive sets of rolls are geared, in the manner shown, to a motor 11, whereby each succeeding set of rolls are operated at a speed exceeding that of a preceding set of rolls. While we have shown an arrangement of drive from the motor to the several sets of roll stands, which will accomplish the results sought, we wish it understood that any other form and arrangement of driving means, which will accomplish the results sought, may be employed.

Located at a suitable point in advance of the first stand 1, there is provided a set of pinch rolls 12 and between said pinch rolls and the stand 1 there is provided preferably a toggle shear 13, and while no special or preferred operating means is shown for operating said shear and pinch rolls it is understood by those skilled in the art of rod mill practice how and by what means the same may be actuated.

Leading away from the pinch rolls is a hot tube 14, which may have a length approximating four hundred (400) feet and heated to a temperature approximating 2200 degrees Fahrenheit. These figures are in no sense limiting figures but express a practice by means of which the method of the invention may be successfully carried on. There is of course unavoidable loss in rod rolling, due to scaling, as is known to those skilled in this art, but such loss may be controlled, to a certain degree by the manner in which the steel is heated. If the steel is heated in an oxidizing atmosphere the scale loss will be higher than if heated in a more or less reducing atmosphere, and it is our belief that by the use of a hot tube we have such a reducing atmosphere as will produce less scale loss. We have not shown any means for heating the hot tube and therefore, we do not desire to be limited to any specific means, as any practical means for heating the tube to the desired temperature may be employed. Sufficient it is to say that the continuous rod, formed by the butt welding of individual billets reaches its maximum or rolling temperature at the exit end of the hot tube, being that end next adjacent the pinch roll 12.

Located immediately in front of the entrance end of the hot tube 14 is a set of pinch or feed rolls 15, driven in any suitable manner and by any suitable mechanism, and movable toward and away from this stand of rolls is an electric welding unit 16. This unit is motor driven, not shown, and in practice should be capable of movement of approximately fifty (50) feet per minute, and the welder is arranged for gripping abutting ends of individual billets which are brought into juxtaposed relation and while so gripped and the billets are advanced by the pinch or feed rolls 15, to weld the abutting ends of the billets into a continuous bar. The welding being accomplished during the advance of the welding unit, releasing the bar at the completion of the welding operation and being moved again to position to grip abutting ends of billets when others are pushed into gripping position. The individual billets are designated a, being approximately thirty (30) feet in length and are preferably supplied from a skid A, being pushed into position in any suitable manner and by any suitable means.

On the completion of the endless rods and as the rods leave the last stand of rolls 10 they are coiled into series of convolutions, as at 17, and the convolutions so formed are laid on suitable conveyors 18 to be moved from the point of coiling. The length of the rods so formed or produced are indeterminate, being produced in endless length, depending of course on the number of billets which are butt welded into a continuous bar. It being understood that whatever length of rod desired may be severed by an operator from the coiled supply. The coiling means may be actuated from a motor 19 and any suitable means may be employed for actuating the said conveyors.

Between the stands 4 and 5 we have shown a flying shear 20 which may be operated in any suitable manner and by any suitable means. Since there are no ends, due to the butt welding of the individual billets, there is no cropping, altho the shear 20 is provided for cropping the end of the bar when initially feeding the mill and for rare emergencies, such as when changing guides, etc., and as stated, there will be no cobbles since the production of endless rods from a continuous bar eliminates this difficulty and consequent loss.

The method so far described, for producing endless rods from a continuous bar formed by butt welding individual billets, is a preferred method, wherein the reduction of the bar to rod size is accomplished with the minimum number of roll stands and with the maximum amount of stretching and wherein the individual billets are welded before the reducing step and furthermore where a maximum length of hot tube is employed. We desire to point out, however, that the same results may be obtained by slight modification in the heating of the billets; one where the billets are pre-heated before the welding step and employing a shorter hot tube for heating the bar to rolling temperature after welding, and another, where the billets are first heated to rolling temperature, then welded to produce a continuous bar and then reducing the bar to rod size without heating again. The first modification is illustrated in Figs. 3 and 4, where the hot tube 14' may have a length approximately one hundred and fifty (150) feet and where a pre-heating furnace 20 takes the place of the skids A which said furnace may be suitably heated to a temperature approximating one thousand (1000°) degrees Fahrenheit and where a pusher bar 21 is employed to push the billets into the pre-heating furnace. The other modification is illustrated in Figs. 5 and 6, where the tubes 14 and 14' are eliminated and in place of the pre-heating furnace 20 there is provided a furnace 22 suitably heated to a temperature approximating twenty two hundred (2200°) degrees Fahrenheit and wherein the individual billets are first heated to rolling temperature, then butt welded and thereafter the continuous bar reduced to rod size without further heating. A pusher bar 23 is employed to place the billets in the furnace, other pusher bars 24 are employed to advance the billets thru the furnace and a pusher bar 25 is employed for ejecting the heated billets from the furnace to be acted on by the welder.

Also, we desire to point out, that in the preferred and two modified methods described, the rod reducing step is accomplished with a minimum number of roll stands (10) and with a maximum amount of stretching between the stands and we suggest that a somewhat comparable result may be obtained in the production of endless rods from a continuous bar formed by butt welding individual billets, with either the preferred or modified arrangement by employing a greater number of roll stands, say twelve (12) or fourteen (14), in which instance there would be employed a medium number of stands and where a lesser amount of stretching of the continuous bar would be done. Also, it may be suggested, that if it is desired, there may be used in the preferred and modified methods sixteen (16) or eighteen (18) stands, in which event the reduction of the continuous bar to rod size would be accomplished alone by rolling and without stretching.

It should be obvious therefore, to those skilled in the art of rod rolling, that we consider the production of endless rods from continuous bars formed by welding individual billets, as the essential to either of the described and referred to methods, and that there are and may be various and different modifications resorted to, in the carrying out of these methods, without departing from the scope and intent of the within described invention and we therefore, do not desire to be limited in any way in the carrying out and in the practice of the invention, other than is expressed by the appended claims.

We claim that with the use of the within described invention that there is a considerable saving in plant investment; a material saving in labor cost, as well as in operating cost; that cropping and cobbling as well as scale loss is substantially, if not wholly eliminated and that the resulting practice in wire drawing especially in continuous wire drawing, is materially enhanced because of the use of endless rods in such practice.

What we claim is:—

1. The method of continuously producing wire rods from a multiplicity of commercial length billets, which consists in placing the billets end to end in juxtaposed relation, and while moving the billets in such relation, butt welding their abutting ends to produce a continuous length of bar and thereafter, by a series of operations on the bar and without interrupting the movement of said bar successively and alternately rolling and stretching said bar, whereby the cross-sectional area of the bar is reduced to rod size.

2. The method of continuously producing wire rods from a multiplicity of commercial length billets, which consists in placing the billets end to end in juxtaposed relation, and while moving the billets in such relation, butt welding their abutting ends to produce a continuous length of bar, heating said bar to rolling temperature and thereafter, by a series of operations on the bar and without interrupting the movement of said bar successively and alternately rolling and stretching the bar, whereby the cross-sectional area of the bar is reduced to rod size.

3. The method of continuously producing wire rods from a multiplicity of commercial length billets, which consists in placing the billets end to end in juxtaposed relation, and while moving the billets in such relation, butt welding their abutting ends to produce a continuous length of bar and thereafter, by a series of operations on the bar and without interrupting the movement of said bar successively and alternately rolling and stretching said bar, whereby the cross-sectional area of the bar is reduced to rod size and finally coiling the continouous rod into a series of convolutions.

4. The method of continuously producing wire rods from a multiplicity of commercial length billets, which consists in placing the billets end to end in juxtaposed relation, and while moving the billets in such relation, butt welding their abutting ends to produce a continuous length of bar, heating the bar to rolling temperature and thereafter, by a series of operations on the bar and without interrupting the movement of said bar successively and alternately rolling and stretching said bar, whereby the cross-sectional area of the bar is reduced to rod size and finally coiling the continuous rod into a series of convolutions.

5. The method of continuously producing wire rods from a multiplicity of commercial length billets, which consists in placing the billets end to end in juxtaposed relation, and while moving the billets in such relation, butt welding their abutting ends to produce a continuous length of bar and thereafter, by a series of operations on the bar and without interrupting the movement of said bar successively and alternately rolling and stretching said bar, whereby the cross-sectional area of the bar is reduced to rod size and finally coiling the continuous rod into a series of convolutions, and removing the coiled rod during coiling from the point of coiling.

6. The method of continuously producing wire rods from a multiplicity of commercial length billets, which consists in placing the billets end to end in juxtaposed relation, and while moving the billets in such relation, butt welding their abutting ends to produce a continuous length of bar, heating the bar to rolling temperature and thereafter, by a series of operations on the bar and without interrupting the movement of said bar successively and alternately rolling and stretching said bar, whereby the cross-sectional area of the bar is reduced to rod size and finally coiling the continuous rod into a series of convolutions and removing the coiled rod during coiling from the point of coiling.

7. A method of continuously producing wire rods from a multiplicity of commercial length billets, which consists in placing such billets end to end in juxtaposed relation, and while moving the billets in such relation electrically butt welding their abutting ends to produce a continuous length of bar and finally and without interrupting the movement of said bar subjecting the bar to a combined rolling and stretching action, resulting in reducing the bar to rod size.

8. The method of continuously producing wire rods from a multiplicity of commercial length billets, which consists in placing the billets end to end in juxtaposed relation, and while moving the billets in such relation electrically butt welding their abutting ends, to produce a continuous length of bar, heating said bar to rolling temperature and finally and without interrupting the movement of said bar subjecting said bar to a combined rolling and stretching action, resulting in reducing the bar to rod size.

9. The method of producing endless wire rods from a continuous length of bar formed by joining individual commercial length billets, which consists in first pre-heating the individual length billets and then moving such billets endwise in abutting relation and during the movement of the billets, in such relation, butt welding their abutting ends, heating said bar to rolling temperature and reducing the bar to rod size by an alternate rolling and stretching action.

10. The method of continuously producing wire rods from a multiplicity of commercial length billets, which consists in successively placing such billets end to end and while moving the billets endwise in such relation butt welding their abutting ends to produce a continuous bar and thereafter, by a series of rolling operations, at relatively different speeds, and without interrupting the forward movement of said bar successively and alternately rolling and stretching said bar, whereby the cross-sectional area of said bar is reduced to rod size, and heating said bar prior to the rolling operation.

11. The method of continuously producing wire rods from a multiplicity of commercial length billets, which consists in successively placing such billets end to end and while moving the billets endwise in such relation butt welding their abutting ends to produce a continuous bar, heating said bar to rolling temperature and thereafter, by a series of rolling operations, at relatively different speeds, and without interrupting the forward movement of such bar successively and alternately rolling and stretching said bar, whereby the cross-sectional area of said bar is reduced to rod size and finally coiling the continuous rod into a series of convolutions and removing such coiled rod during coiling from the point of coiling.

12. The method of continuously producing wire rods from a multiplicity of commercial length billets, which consists in initially heating the individual billets then placing the same end to end and while moving the billets in such relation butt welding their abutting ends to produce a continuous length of bar, heating the continuous bar to rolling temperature and thereafter, by a series of operations on said bar and without interrupting the movement of said bar successively and alternately rolling and stretching the bar, whereby the cross-sectional area of the bar is reduced to rod size.

13. The method of continuously producing wire rods from a multiplicity of commercial length billets, which consists in placing the billets end to end in juxtaposed relation and while moving the billets in such relation employing a reciprocal welder to move with the billets and butt weld their abutting ends to produce a continuous length of bar and thereafter, by a series of operations on said bar and without interrupting the movement of said bar successively and alternately rolling and stretching said bar, whereby the cross-sectional area of the bar is reduced to rod size, and finally coiling the continuous rod into a series of convolutions and simultaneously conveying such continuous coils away from the point of coiling.

14. The method of continuously producing wire rods from a multiplicity of commercial length billets, which consists in placing the billets end to end in juxtaposed relation and while moving the billets in such relation employing a reciprocal welder to move with the billets and butt weld their abutting ends to produce a continuous length of bar, heating the bar to rolling temperature and thereafter, by a series of operations on said bar and without interrupting the movement of said bar successively and alternately rolling and stretching said bar, whereby the cross-sectional area of the bar is reduced to rod size, and finally coiling the continuous rods into a series of convolutions and simultaneously conveying such continuous coils away from the point of coiling.

15. The method of continuously producing wire rods from a multiplicity of commercial length billets, which consists in placing the billets end to end in juxtaposed relation and while moving the billets in such relation employing a reciprocal welder to move with the billets and butt weld their abutting ends to produce a continuous length of bar and thereafter, by a series of operations on said bar and without interrupting the movement of said bar successively and alternately rolling and stretching said bar whereby the cross-sectional area of the bar is reduced to rod size, coiling the continuous rod into a series of convolutions and simultaneously conveying such continuous coils away from the point of coiling, and selectively severing a coiled length of rod from its supply.

16. The method of continuously producing wire rods from a multiplicity of commercial length billets, which consists in placing the billets end to end in juxtaposed relation and while moving the billets in such relation employing a reciprocal welder to move with the billets and butt weld their abutting ends to produce a continuous length of bar, heating the bar to rolling temperature and thereafter, by a series of operations on said bar and without interrupting the movement of said bar successively and alternately rolling and stretching said bar whereby the cross-sectional area of the bar is reduced to rod size, coiling the continuous rod into a series of convolutions and simultaneously conveying such continuous coils away from the point of coiling, and selectively severing a coiled length of rod from its supply.

WILLIAM HERMAN.
WILLIAM H. SOMMER.